(12) United States Patent
Ju

(10) Patent No.: US 11,824,679 B2
(45) Date of Patent: Nov. 21, 2023

(54) METHOD AND APPARATUS FOR MANAGING ELECTRONIC DEVICE

(71) Applicant: LG ELECTRONICS INC., Seoul (KR)

(72) Inventor: Hyunwoo Ju, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/383,805

(22) Filed: Jul. 23, 2021

(65) Prior Publication Data

US 2022/0029848 A1    Jan. 27, 2022

(30) Foreign Application Priority Data

Jul. 27, 2020  (KR) .................. 10-2020-0093307

(51) Int. Cl.
*H04L 12/28*        (2006.01)
*G10L 15/22*        (2006.01)
*H04L 41/0806*      (2022.01)

(52) U.S. Cl.
CPC ............ *H04L 12/282* (2013.01); *G10L 15/22* (2013.01); *H04L 12/2809* (2013.01); *H04L 12/2832* (2013.01); *H04L 41/0806* (2013.01); *H04L 2012/285* (2013.01)

(58) Field of Classification Search
CPC ............... H04L 12/282; H04L 12/2809; H04L 12/2832; H04L 41/0806; H04L 2012/285; H04L 41/0853; H04L 12/2807; H04L 12/281; H04L 12/2823; H04L 2012/2841; G10L 15/22; G06F 3/04817; G06F 3/16; H04W 12/068; H04W 12/08; H04W 48/20
See application file for complete search history.

(56) References Cited

U.S. PATENT DOCUMENTS

| 10,747,555 | B2 | 8/2020 | Kum et al. |
| 10,978,044 | B2 | 4/2021 | Kwon et al. |
| 11,071,153 | B2 | 7/2021 | Lee et al. |
| 2018/0096690 | A1* | 4/2018 | Mixter ............... G06F 3/167 |
| 2020/0184952 | A1* | 6/2020 | Kwon ............... H04W 12/06 |
| 2020/0302930 | A1* | 9/2020 | Chen ................ G10L 15/30 |

FOREIGN PATENT DOCUMENTS

| KR | 10-2018-0016022 A | 2/2018 |
| KR | 10-2018-0083787 A | 7/2018 |
| KR | 10-2019-0028212 A | 3/2019 |
| KR | 10-2019-0099586 A | 8/2019 |

OTHER PUBLICATIONS

Korean Office Action dated Oct. 21, 2022 issued in Application 10-2020-0093307.

* cited by examiner

*Primary Examiner* — Tejal Gami
(74) *Attorney, Agent, or Firm* — KED & Associates LLP

(57) ABSTRACT

The present disclosure relates to a method and an apparatus for managing an electronic device. The method and apparatus may allow a user to input a registration instruction to a user terminal using the user's voice without directly inputting or confirming various types of information, when the user registers an electronic device in the user's account as an electronic device to be managed. For example, the user may utter (or speak) a product family of the electronic device to be registered, and an instruction to request registration, thereby enabling the user to register the electronic device in the user's account as an electronic device to be managed as a result of manipulation performed more simply and less frequently.

20 Claims, 17 Drawing Sheets

METHOD AND APPARATUS FOR MANAGING ELECTRONIC DEVICE

CROSS-REFERENCE TO RELATED APPLICATION

This application claims priority under 35 U.S.C. § 119 to Korean Application No. 10-2020-0093307, filed Jul. 27, 2020, the subject matter of which is hereby incorporated by reference.

BACKGROUND

1. Field

The present disclosure relates to a method and an apparatus for managing an electronic device.

2. Background

Internet of Things (IoT) technologies denote intelligence technologies and services that connect all things based on the Internet, i.e., a network and enable mutual communication based on human-to-thing information and thing-to-thing information. The IoT technologies are further advanced than the wired communication-based Internet or mobile Internet. Electronic devices, to which the IoT technologies are applied, can be connected through a network and perform their own functions based on a user's remote control. The IoT technologies seem to be similar to M2M (Machine to Machine) communication. However, the M2M communication is mainly intended for communication between communication equipment and a user. The IoT technologies allow an electronic device, connected through a network, to interact with all the information in the real world and virtual world as well as things.

The IoT technologies have served as a platform for smart home appliances. The IoT technologies enable various types of electronic devices, such as a refrigerator, a washing machine, an air conditioner and the like at homes, to be connected through a network and allow a user to remotely control each of the electronic devices or confirm an operation state of each of the electronic devices in real time.

To control electronic devices at homes using the IoT technologies, the electronic devices to be controlled may need to be registered on a network through a terminal for control, e.g., a mobile terminal such as a smartphone. As a related art concerning the IoT technologies, an artificial intelligence home appliance network system and a method for operating the same are disclosed in Korean Patent Publication No. 10-2018-0016022, the subject matter of which is incorporated herein by reference.

FIG. 1 shows a configuration of a network between electronic devices, to which IoT technologies of related art are applied, and a user terminal. As shown in FIG. 1, a user can remotely control electronic devices 102 (e.g., an air conditioner or a washing machine) at homes, and/or can confirm operation states of the electronic devices 102 in real time using a user terminal 104 (e.g., a mobile terminal or a tablet).

The user may execute an application for managing an electronic device 102, installed on the user terminal 104, and input an instruction for controlling the electronic device 102 or requests inquiry into information on an operation state of the electronic device 102. The user terminal 104 may transmit a control instruction to an electronic device managing server 108 or request the electronic device managing server 108 to transmit information on the electronic device 102 at the request of the user.

The electronic device managing server 108 communicates with the electronic device 102 through an access point 106 installed in a home. The electronic device managing server 108 delivers the control instruction input by the user to the electronic device 102 through the access point 106 or requests the electronic device 102 to transmit the information on the operation state of the electronic device 102. The electronic device 102 is controlled under the control instruction input by the user, or transmits the information on the operation state of the electronic device 102 to the electronic device managing server 108 through the access point 106.

The electronic device managing server 108 transmits the received information on the operation state of the electronic device 102 to the user terminal 104. Through the above process, the user can remotely control the electronic device 102 or confirm information on the operation state of the electronic device 102 in real time using the user terminal 104.

To perform the above process of managing the electronic device 102, the electronic device 102 may need to be registered in the electronic device managing server 108 as a device to be managed by the user. For the user to manage the electronic device 102 through the application for managing an electronic device, a procedure of registering the electronic device 102 (in the electronic device managing server 108) as a device to be managed may need to be performed in advance.

FIGS. 2 to 9 respectively show a screen on a display of a user terminal during a process of registering an electronic device in a disadvantageous arrangement. In the arrangement of FIGS. 2 to 9, a tower air conditioner is described as an example of an electronic device to be registered by a user.

As a result of execution of the application for managing the electronic device 102 by the user, an initial screen, as shown in FIG. 2, is displayed on the display of the user terminal 104. The user presses (or touches) a registration button 202 to register the electronic device 102.

As a result of the user pressing of the registration button 202 on the initial screen in FIG. 2, a product selection screen, as shown in FIG. 3, is displayed on the display of the user terminal 104. A product group (e.g., an air conditioner/air care, an IoT hub) is displayed on the product selection screen. As a result of selection of any one device in the product group (e.g., an air conditioner/air care) by the user, a product family (e.g., a wall-mounted air conditioner, a tower air conditioner, a split system air conditioner, an air cleaner, and a dehumidifier) included in the selected product group is displayed. In the arrangement of FIG. 3, the user selects the product group of air conditioner/air care 204 to which the electronic device 102 to be registered belongs and then selects the tower air conditioner 206 from the product family including the electronic device 102.

As a result of selection of the product family of the electronic device 102 to be registered by the user, a screen for requesting confirmation of product features of the electronic device 102 is displayed on the display of the user terminal 104 to confirm a product model of the electronic device 102 to be registered, as shown in FIG. 4. In disadvantageous arrangements, products that belong to the same product family but belong to different product models have different features. For example, a tower air conditioner that belongs to the product family of tower air conditioner and a product model A may be provided with a Wi-Fi button on a control panel at a front thereof, while a tower air conditioner that belongs to the product family of tower air conditioner and a product model B may not be provided with a Wi-Fi button on a control panel at a front thereof. The user checks whether the Wi-Fi button is disposed on the control panel at the front of the electronic device 102, and if there is the Wi-Fi button on the control panel, the user may press (or touch) a Yes button 207, and if not, the user may press (or touch) a No button 208.

In the arrangement of FIG. 4, as a result of confirmation of the Wi-Fi button on the control panel at the front of the electronic device 102 and pressing of the Yes button 207 by the user, the display of the user terminal 104 displays a guide message saying "Press the Wi-Fi button for three seconds". As a result of pressing of the No button 208 by the user, the display of the user terminal 104 displays another guide message as shown in FIG. 5.

The user presses (or touches) a specific button of a remote controller according to the guide message in FIG. 5, and then checks whether the "Wi-Fi" icon flickers. The user presses Yes button 209 or No button 210 depending of results of the check.

As a result of activation of a Wi-Fi function of the electronic device 102 by the user according to the above guide message, the electronic device 102 operates as a Soft Access Point for communication connection with the user terminal 104. Accordingly, the electronic device 102 may broadcast its Service Set Identifier (SSID) for communication connection.

The user activates the Wi-Fi function of the user terminal 104 according to the guide message on the screen as shown in FIG. 6, and inputs the SSID and password of the electronic device 102. Accordingly, the user terminal 104 performs communication connection with the electronic device 102, and as a result, the user terminal 104 can communicate with the electronic device 102.

The user may then input an SSID 212 and a password 214 of the access point 106 in the home respectively according to the guide message on the screen shown in FIG. 7. As a result of pressing of a connect button 216 by the user, the SSID 212 and the password 214 of the access point 106, input by the user, is respectively delivered to the electronic device 102, and the electronic device 102 performs communication connection with the access point 106 based on the received SSID 212 and password 214 of the access point 106.

As a result of completion of the electronic device 102's communication connection with the access point 106, the electronic device 102 performs communication connection with the electronic device managing server 108 through the access point 106, and requests the electronic device managing server 108 to register the electronic device 102 as an electronic device to be managed. During the electronic device 102's communication connection with the electronic device managing server 108 and request for registration, a registration progress rate is displayed on the screen of the user terminal 104, as shown in FIG. 8.

Having received the request for registration from the electronic device 102, the electronic device managing server 108 registers the electronic device 102 in the user's account as an electronic device to be managed with reference to information (e.g., a product model, specifications and the like) on the electronic device 102, transmitted by the electronic device 102.

After completion of the registration, the initial screen is displayed again on the display of the user terminal 104, as shown in FIG. 9. In this example, an inquiry tab 218 for inquiring into information on the registered electronic device or controlling the registered electronic device is displayed on the initial screen. The inquiry tab 218 displays a power button 220 for powering on or off the electronic device 102 and an operation state of the electronic device 102 respectively.

In the arrangements described with reference to FIGS. 2 to 9, the registration of the electronic device 102 in the electronic device managing server 108 may require complex and various procedures, causing inconvenience to the user. In disadvantageous arrangements, the user needs to directly confirm features of the electronic device 102 and directly input various types of information through the user terminal 104 during confirmation of product features (FIGS. 3 to 5), the communication connection (FIGS. 6 and 7), and/or the like. Due to complex and various procedures, registration of the electronic device 102 may cause inconvenience and difficulty to the user. Additionally, some users (e.g., the elderly) can have difficulty in confirming features of the electronic device 102 and manipulating the user terminal 104.

Further, the user terminal 104's communication connection with the electronic device 102 may require access information (e.g., an SSID and a password) of the electronic device 102. The access information of each electronic device 102 may differ depending on a product model. Accordingly, during the registration of the electronic device 102, the user may need to directly confirm features of the electronic device 102 as well as a product group or a product family of the electronic device 102, and may need to directly input the access information of the electronic device 102 as shown in FIG. 6. Thus, the user may find it difficult and inconvenient to confirm features of the electronic device 102 and input the access information of the electronic device 102. When the user inputs the access information of the electronic device 102 incorrectly, the registration of the electronic device 102 may fail.

BRIEF DESCRIPTION OF THE DRAWINGS

The accompanying drawings constitute a part of the specification, illustrate one or more arrangements and/or embodiments in the disclosure, and together with the specification, explain the disclosure, wherein.

DETAILED DESCRIPTION

Figure 1:
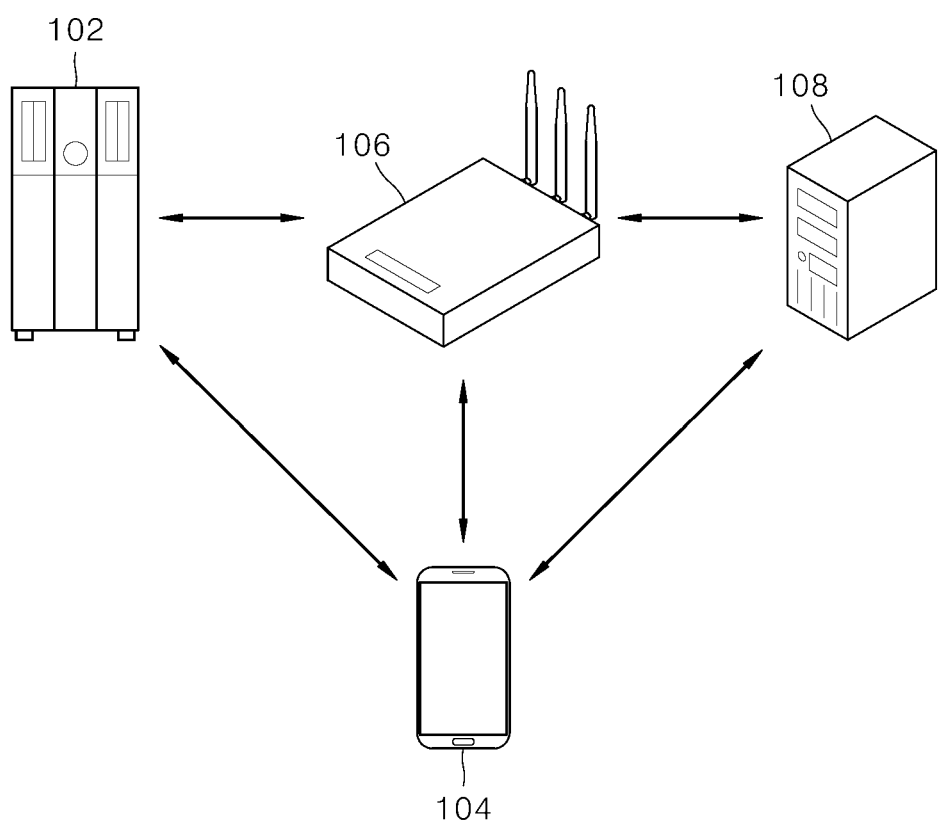
FIG. 1 shows a configuration of a network between electronic devices, to which IoT technologies of the related art are applied, and a user terminal.
Figure 2:
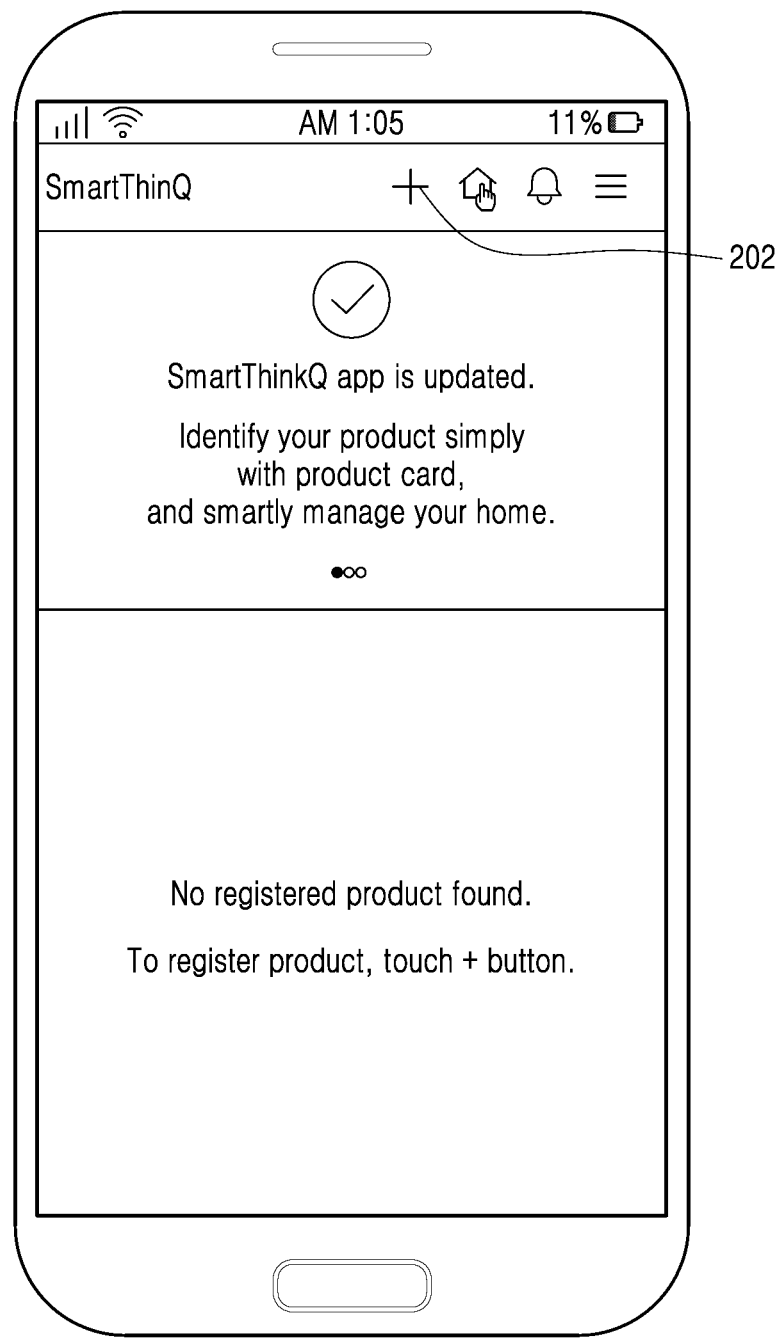
FIGS. 2 to 9 respectively show a screen on a display of a user terminal during a process of registering an electronic device in disadvantageous arrangements.

Features and advantages are specifically described hereunder with reference to the accompanying drawings such that one having ordinary skill in the art to which the present disclosure pertains can easily implement the technical spirit of the disclosure. Preferred embodiments according to the disclosure are specifically described with reference to the accompanying drawings. In the drawings, identical reference numerals can denote identical or similar components.

The present disclosure may be directed to a method and an apparatus for managing an electronic device that allows a user to register an electronic device in a user's account as an electronic device to be managed as a result of manipulation that is performed more simply and less frequently.

The present disclosure may be directed to a method and an apparatus for managing an electronic device that enables communication connection between an electronic device and a user terminal during registration of the electronic device in a user's account as an electronic device to be managed, without causing the user to directly input access information of the electronic device.

Figure 10:
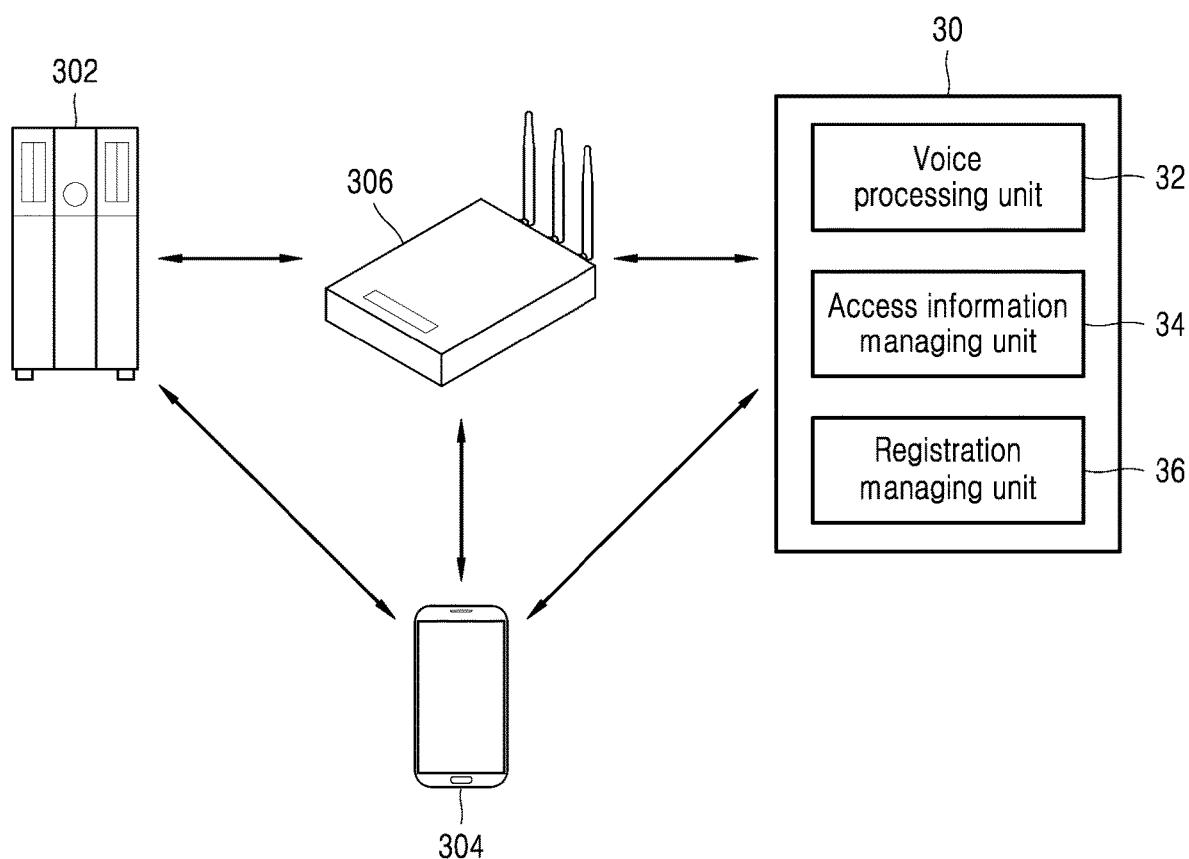
FIG. 10 shows a configuration of a network among an apparatus for managing an electronic device in one embodiment, electronic devices, and a user terminal.

FIG. 10 shows a configuration of a network among an apparatus for managing an electronic device according to one example embodiment, electronic devices, and a user terminal. A user may register an electronic device 302 in places such as homes or offices in a user's account, using an application installed on a user terminal 304. The application installed on the user's terminal may be used to seek for information on an operation of the electronic device 302 and/or control an operation of the electronic device 302. The application installed on the user terminal 304 may be distributed by an electronic device managing apparatus 30 (and/or an apparatus for managing an electronic device).

The user terminal 304 may be a terminal that includes a processor for processing an instruction or for calculation, a display for displaying various types of information, a voice input device (e.g., a microphone) capable of receiving a voice input by a user, a voice output device (e.g., a speaker) capable of outputting a voice (or other audio), and a communication module (or communication device) capable of communicating with other devices. Other electronic components may also be provided. The user terminal 304 may include a mobile terminal such as a smartphone, a tablet, desktop, a laptop and/or the like, for example, but is not so limited. A smartphone may be provided in the following embodiment(s) as an example of the user terminal 304.

The electronic device 302 may be powered (or driven) by electric energy, and may include a series of devices that are driven for specific purposes. The electronic device 302 may include a refrigerator, a washing machine, an air conditioner, an air cleaner and/or the like installed in places such as homes or offices, for example, but is not so limited. The electronic device 302 may include a communication module (or communication device) capable of communicating with other devices. An air conditioner may be used as an example of the electronic device 302 in the following description of the embodiments.

An access point 306 may connect to a communication line installed in places (such as homes or offices) and transmit wireless signals. The user terminal 304 and the electronic device 302 may be disposed within a range where the user terminal 304 and the electronic device 302 receive the wireless signals of the access point 306. The access point 306 may receive wireless signals transmitted from a device such as the user terminal 304 or the electronic device 302 that is connected to the access point 306 in a communicable manner to transmit the wireless signals outward through the communication line, and/or may convert signals input from the outside through the communication line into wireless signals to transmit the wireless signals. Accordingly, the electronic device 302 connected to the access point 306 may communicate with the electronic device managing apparatus 30.

The electronic device managing apparatus 30 may include a voice processing unit 32 (e.g., a voice processing device and/or a voice processor), an access information managing unit 34 (e.g., an access information managing device and/or an access information manager), and a registration managing unit 36 (e.g., a registration managing device and/or a registration manager). The electronic device managing apparatus 30 includes hardware, and may include other electronic components.

The voice processing unit 32 may receive, from the user terminal 304, a vocal registration instruction for registering the electronic device 302. In at least one embodiment, the user may input a registration instruction to the user terminal 304 to register the electronic device 302 by using the user's voice. The user terminal 304 may transmit the vocal registration instruction (input by the user) to the voice processing unit 32. The voice processing unit 32 may extract, from the vocal registration instruction, the registration instruction and a name of the electronic device 302.

The access information managing unit 34 may generate (or obtain) access information of the electronic device 302 based on the vocal registration instruction, and may transmit the access information of the electronic device to the user terminal 304. As a result of extracting the registration instruction and the name of the electronic device 302 by the voice processing unit 32, the access information managing unit 34 may generate (or obtain) access information of the electronic device 302 with reference to the extracted name of the electronic device 302.

The access information of the electronic device 302 may include a Service Set Identifier (SSID) of the electronic device 302. Additionally, the access information of the electronic device 302 may include a password corresponding to the SSID. The access information may include other specific information of the electronic device.

The SSID of the electronic device 302 may be set differently for each product family of the electronic device 302. For example, in an air conditioner family of the electronic device 302, all the air conditioners may be provided (or given) the same SSID (e.g., "LG_AIRCONDITIONER") regardless of the types (a tower air conditioner, a wall-mounted air conditioner and/or the like) and/or the product models of the air conditioners. In another example, a standard version of refrigerators or a high-end version of refrigerators may all be provided (or given) the same SSID (e.g., 'LG_REFRIGERATOR'). It is to be noted that a range of a product family of the electronic devices 302 and/or the sort of the electronic devices 302 belonging to each product family may be set differently.

According to the present disclosure, electronic devices belonging to the same product family may be provided (or given) the same SSID, as described above. A user who uses an electronic device can easily distinguish a product family (e.g., an air conditioner, a washing machine, a dryer, a refrigerator and/or the like) of the electronic device, but may have difficulty in confirming the specific features or product model and/or the like of the electronic device. Accordingly, when the user incorrectly confirms the specific features or the product model and the like of the electronic device, the electronic device can not perform communication. As a result, it is highly likely that the registration of the electronic device fails. However, according to the present disclosure, since access information of an electronic device is set based on a product family and may be easily distinguished by the user, registration of the electronic device is less likely to fail.

The user may input access information of the access point 306 to the user terminal 304 during registration of the electronic device 302. The access information of the access point 306 input by the user may be delivered to the access information managing unit 34, and the access information managing unit 34 may store the access information of the access point 306. The access information managing unit 34 may transmit the access information of the access point 306 to the user terminal 304.

As a result of transmission of the access information of the electronic device 302 to the user terminal 304, the electronic device 302 may broadcast the access information of the electronic device 302. Based on the access information of the electronic device 302 received from the access information managing unit 34, the user terminal 304 may perform a communication connection with the electronic device 302. As a result of completion of the user terminal's communication connection with the electronic device 302, the user terminal 304 may transmit the access information of the access point 306 (received from the access information managing unit 34) to the electronic device 302. Based on the access information of the access point 306 received from the user terminal 304, the electronic device 302 may perform communication connection with the access point 306. Accordingly, the electronic device 302 may communicate with the electronic device managing apparatus 30 through the access point 306.

As a result of completion of the user terminal's communication connection with the electronic device 302 based on the access information of the electronic device 302, the registration managing unit 36 may receive (from the electronic device 302) identification information of the electronic device 302. Based on the identification information of the electronic device 302, the registration managing unit 36 may register the electronic device 302 in a user account and transmit specification information of the electronic device 302 to the user terminal 304.

The identification information of the electronic device 302 may include the product model name or the product model number of the electronic device 302. Additionally, the specification information of the electronic device 302 may include information on specifications and/or functions of the electronic device 302. The specifications and/or functions of the electronic device 302 may vary depending on models of the electronic device 302. Accordingly, the registration managing unit 36 may obtain the specification information of the electronic device 302 with reference to a database for storing the specification information corresponding to the identification information of the electronic device 302, and may transmit the obtained specification information to the user terminal 304.

The registration managing unit 36 may transmit (to the user terminal 304) driving state information of the electronic device 302, or transmit (to the electronic device 302) a driving instruction input from the user terminal 304, based on the specification information of the electronic device 302.

As a result of transmission of the specification information of the electronic device 302 to the user terminal 304, the user terminal 304 may recognize completion of registration of the electronic device 302 and output a text message or a voice message for indicating the completion of the registration of the electronic device 302. The user may then recognize the completion of the registration of the electronic device 302.

FIGS. 11 to 16 respectively show a screen on a display of a user terminal during a process of registering an electronic device according to one example embodiment. FIG. 17 is a flow chart showing a method for managing an electronic device according to one example embodiment. The method for managing an electronic device is described based on FIG. 17 with reference to FIGS. 11 to 16.

A user may execute an application (for managing an electronic device) that is installed on the user terminal 304. The user may input information on the user's account when executing the application for the first time.

Figure 11:
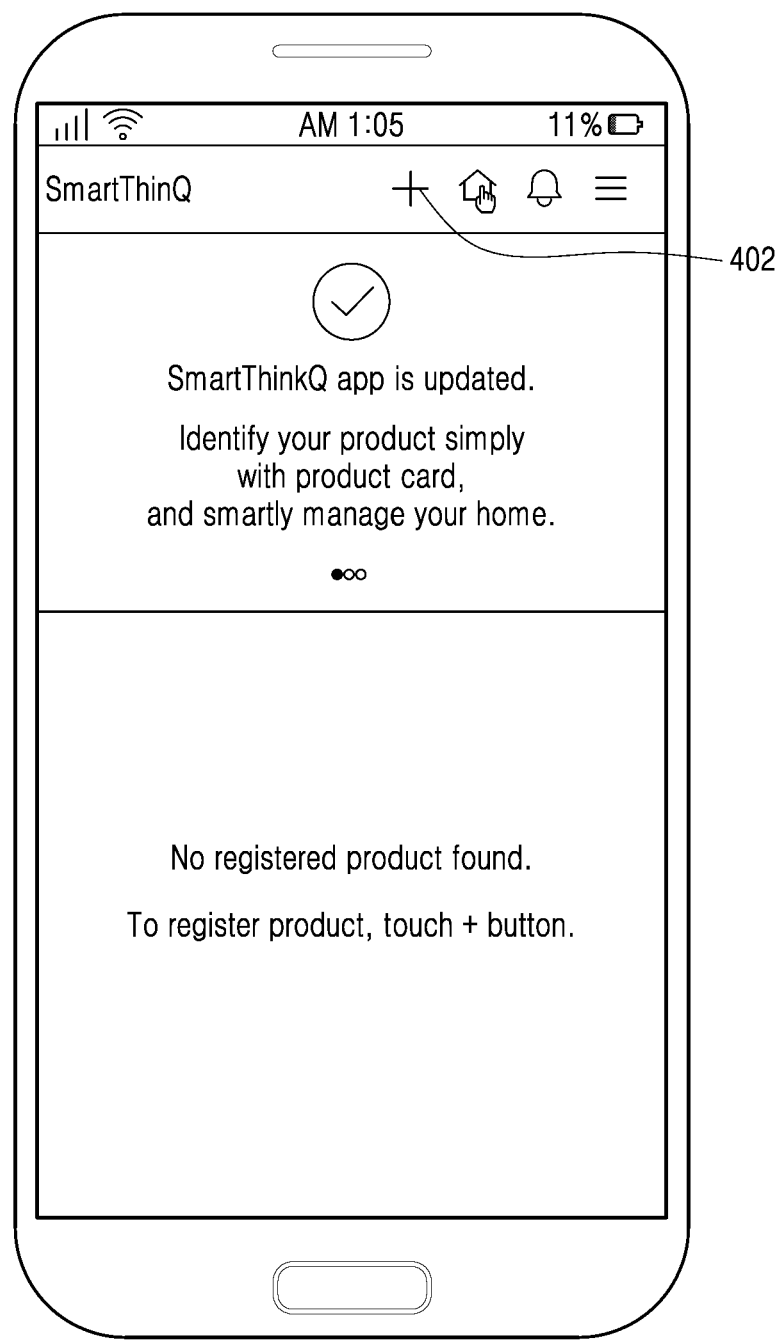
FIGS. 11 to 16 respectively show a screen on a display of a user terminal during a process of registering an electronic device in one embodiment.

When the user executes the application for managing an electronic device, an initial screen (as shown in FIG. 11) may be displayed on the screen of the user terminal 304. When no registered product is found after the execution of the application for managing an electronic device, a message, stating that no registered product is found, may be displayed (as shown in FIG. 11).

Figure 12:
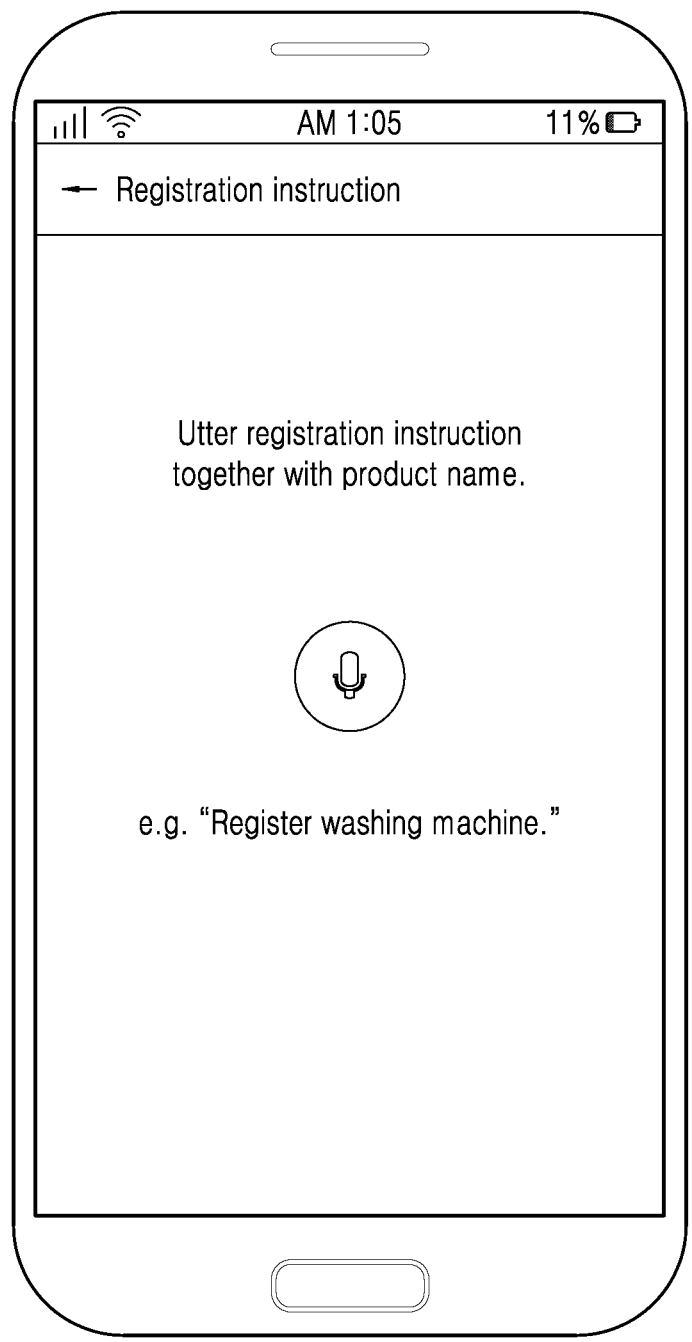

The user may request registration of a new product by pressing (or touching) a registration button 402 on the initial screen in FIG. 11 to register the electronic device 302 (502). As a result of a request for registration of the new product by the user, the user terminal 304 may display a screen for requesting input of a vocal registration instruction, as shown in FIG. 12, and may request the user to input a vocal registration instruction (504). With reference to an example on the screen, the user may utter (or speak) a registration instruction such as "Register air conditioner", or "Registration of washing machine", and/or the like. The registration instruction uttered by the user may be input to the user terminal 304 through a voice input device (e.g., a microphone) of the user terminal 304.

Figure 13:
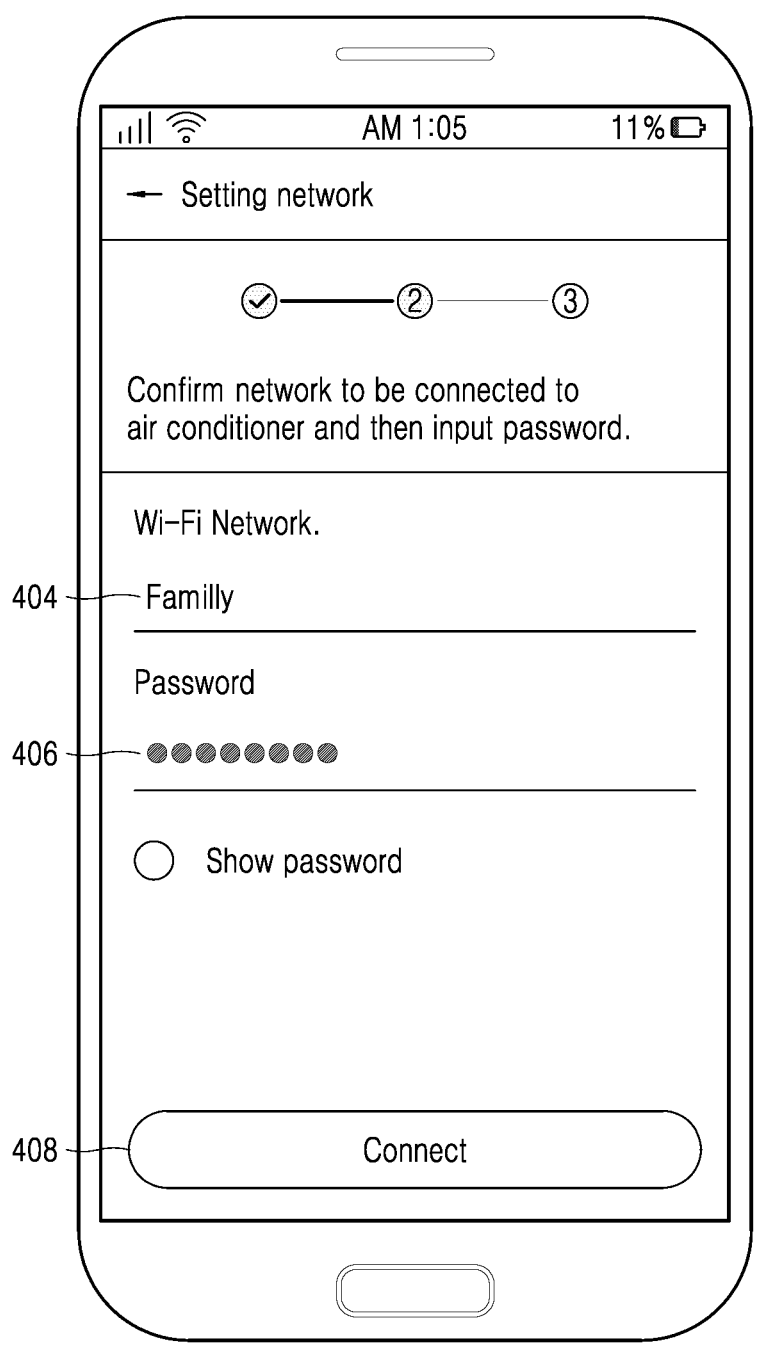
Figure 14:
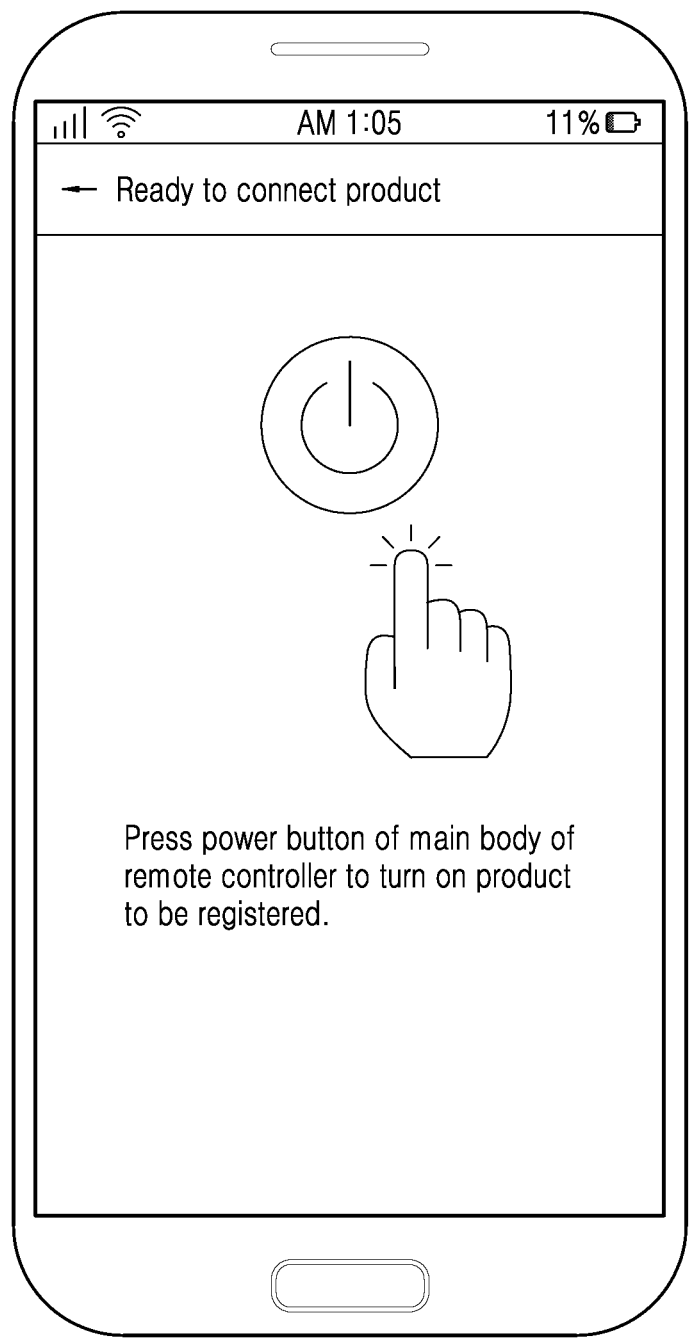

As a result of input of the vocal registration instruction by the user, the user terminal 304 may display a screen (as shown in FIG. 13) for requesting input of access information of the access point 306 and request the user to input the access information of the access point 306 (508). The user may respectively input the access information of the access point 306, i.e., an SSID 404 and a password 406 of the access point 306 (510). When the user presses (or touches) a connect button 408 (or connection button) after inputting the access information of the access point 306, the user terminal 304 may deliver the access information of the access point 306 to the registration managing unit 36 (512). If the user already input the access information of the access point 306 during registration of another electronic device, the request for the access information of the access point 306 (508), the input of the access information of the access point 306 (510), and/or the delivery of the access information of the access point 306 to the registration managing unit 36 (512) may be omitted.

The user terminal 304 may deliver the vocal registration instruction input by the user to the voice processing unit 32 (514). The voice processing unit 32 may respectively extract a registration instruction (e.g., "register" or "registration") and the name of the electronic device (e.g., "air conditioner" or "washing machine") from the vocal registration instruction input by the user (516). The voice processing unit 32 may separate and extract the registration instruction and the name of the electronic device respectively as a result of analysis of the vocal registration instruction input by the user, using a voice processing technology.

The voice processing unit 32 may deliver the extracted registration instruction (e.g., registration) and the name of the electronic device (e.g., an air conditioner) to the access information managing unit 34 (518).

The access information managing unit 34 may confirm that the registration instruction received from the voice processing unit 32 is "registration" to recognize the user's request for the registration of the electronic device. Additionally, the access information managing unit 34 may generate (or provide) access information of the electronic device 302 with reference to "air conditioner" which is the name of the electronic device, received from the voice processing unit 32 (520). For example, the access information managing unit 34 may set an SSID of the electronic device 302 to "LG_AIRCONDITIONER" with reference to a database, and set a password corresponding to the SSID of "LG_AIRCONDITIONER" to a predetermined password (e.g., "qwer1234"). Accordingly, the access information of the electronic device 302 may be set to "LG_AIRCONDITIONER" and "qwer1234".

The access information set by the access information managing unit 34 (i.e., access information the same as the SSID and the password) is previously stored in the electronic device 302. That is, the access information managing unit 34 may generate or provide access information which is the same as the access information previously stored in the electronic device 302.

The access information managing unit 34 may request a registration managing unit 36 to deliver the access information of the access point 306 (522). The registration managing unit 36 may deliver the previously stored access information of the access point 306 to the access information managing unit 34 (524).

The access information managing unit 34 may deliver the generated access information of the electronic device 302, and the access information of the access point 306 received from the registration managing unit 36 to the user terminal 304 (526).

The user terminal 304 may then display a screen (shown in FIG. 14) for requesting supply of power and request the user to power on the electronic device 302 (528). Accordingly, the user may press a power button of the electronic device 302 and supply power to the electronic device 302 (530). As a result of supply of power to the electronic device 302, the electronic device 302 may automatically broadcast its access information, i.e., the SSID (532).

The electronic device 302 may broadcast the SSID only for a predetermined set time (e.g., 3 minutes) after power of the electronic device 302 is applied. If the communication connection between the electronic device 302 and the access point 306 fails within the predetermined set time, the user terminal 304 may request the user to power off and then to power on the electronic device 302.

Figure 5:
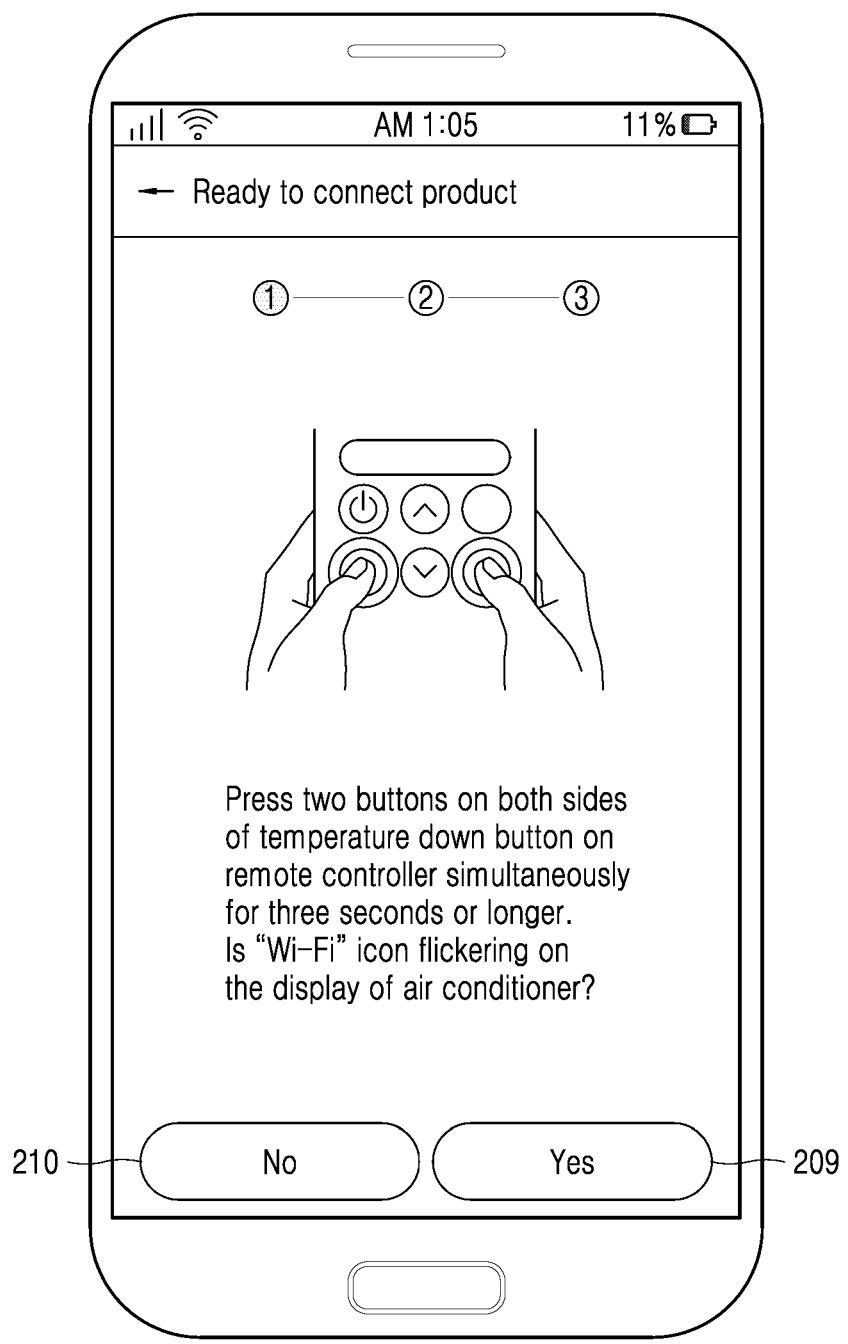

Depending on embodiments, the user terminal 528 may request the user to operate the electronic device 302 for broadcasting of the access information after the supply of power to the electronic device 302, as shown in FIG. 5.

As a result of broadcasting of the SSID by the electronic device 302, the user terminal 304 may confirm the SSID of the electronic device 302 on an accessible access point list, and may access the electronic device 302 using a password included in the access information of the electronic device 302, previously received from the access information managing unit 34 to perform communication connection with the electronic device 302 (534).

After completing the communication connection with the electronic device 302, the user terminal 304 may deliver the access information of the access point 306 (i.e., the SSID and password of the access point 306) to the electronic device 302 (536). The electronic device 302 may access the access point 306 using the received access information of the access point 306. Accordingly, the electronic device 302 may communicate with the electronic device managing apparatus 30 through the access point 306.

The electronic device 302 may deliver its own identification information to the electronic device managing apparatus 30 (538). For example, the electronic device 302 may deliver its identification information, such as a model name, a model number, a serial number, to the electronic-device managing apparatus 30.

The registration managing unit 36 may register the electronic device 302 in a user account based on the identification information of the electronic device 302 (540). That is, the registration managing unit 36 may make the electronic device 302 belong to the user account pre-stored in the database. One or more electronic devices may belong to a single user account.

Additionally, the registration managing unit 36 may obtain specification information of the electronic device 302, corresponding to the identification information of the electronic device 302, while registering the electronic device 302 in the user account. The specification information of the electronic device 302 may include information on specifications and/or functions of the electronic device 302. Depending on a model of the electronic device 302, the electronic device 302 may have different specifications and/or functions. Accordingly, the registration managing unit 36 may obtain the specification information of the electronic device 302 with reference to the database storing the specification information corresponding to the identification information of the electronic device 302, and/or may deliver the obtained specification information to the user terminal 304 (542). Thus, the user terminal 304 may recognize and display the specification information of the electronic device 302, i.e., the specifications of the electronic device 302 or functions performed by the electronic device 302.

Figure 15:
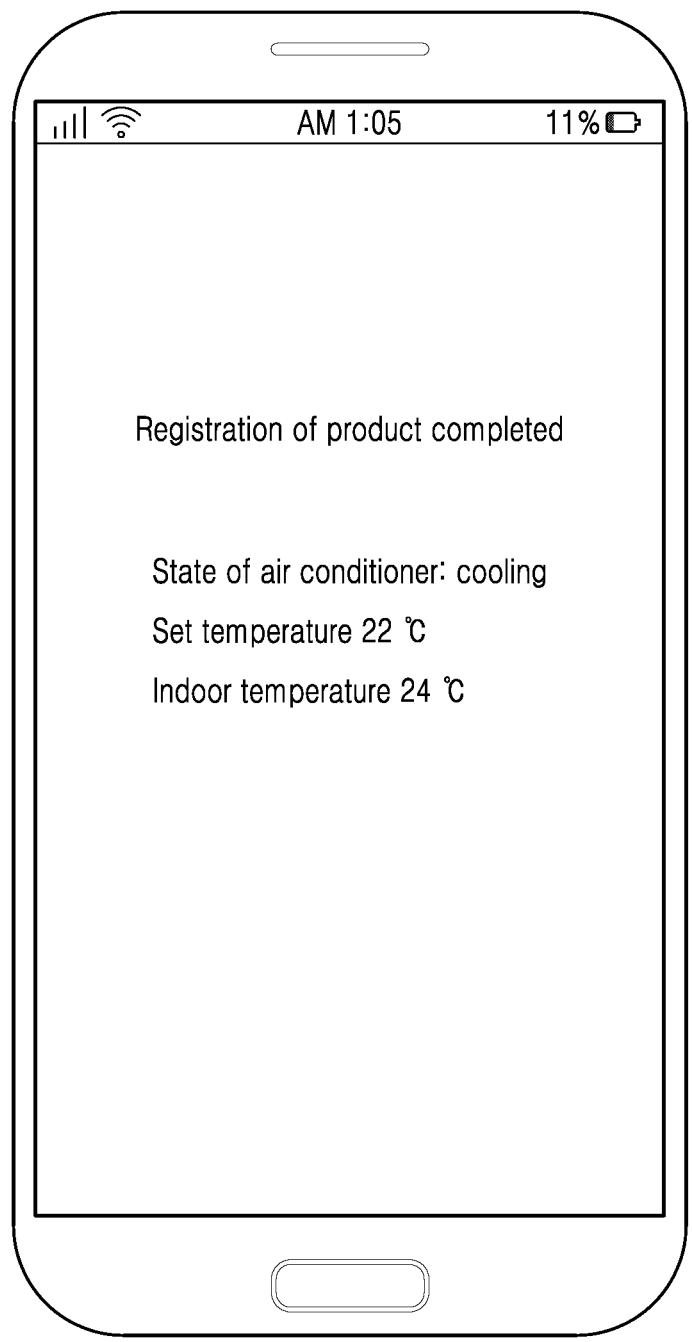

After receiving the specification information of the electronic device 302 from the registration managing unit 36, the user terminal 304 may confirm completion of the registration of the electronic device 302 and inform the user about the completion of the registration of the electronic device 302 (544). The user terminal 304 may display a text message for indicating that registration of the electronic device 302 is completed or information on an operation state of the electronic device 302, as shown in FIG. 15. In at least one embodiment, the user terminal 304 may output (through a voice output device (e.g., speaker)) a voice message indicating the registration of the electronic device 302 is completed. The user may confirm the completion of the registration of the electronic device 302 easily and intuitively through the text message or the voice message without paying attention to the user terminal 304 during the registration of the electronic device 302.

Figure 16:
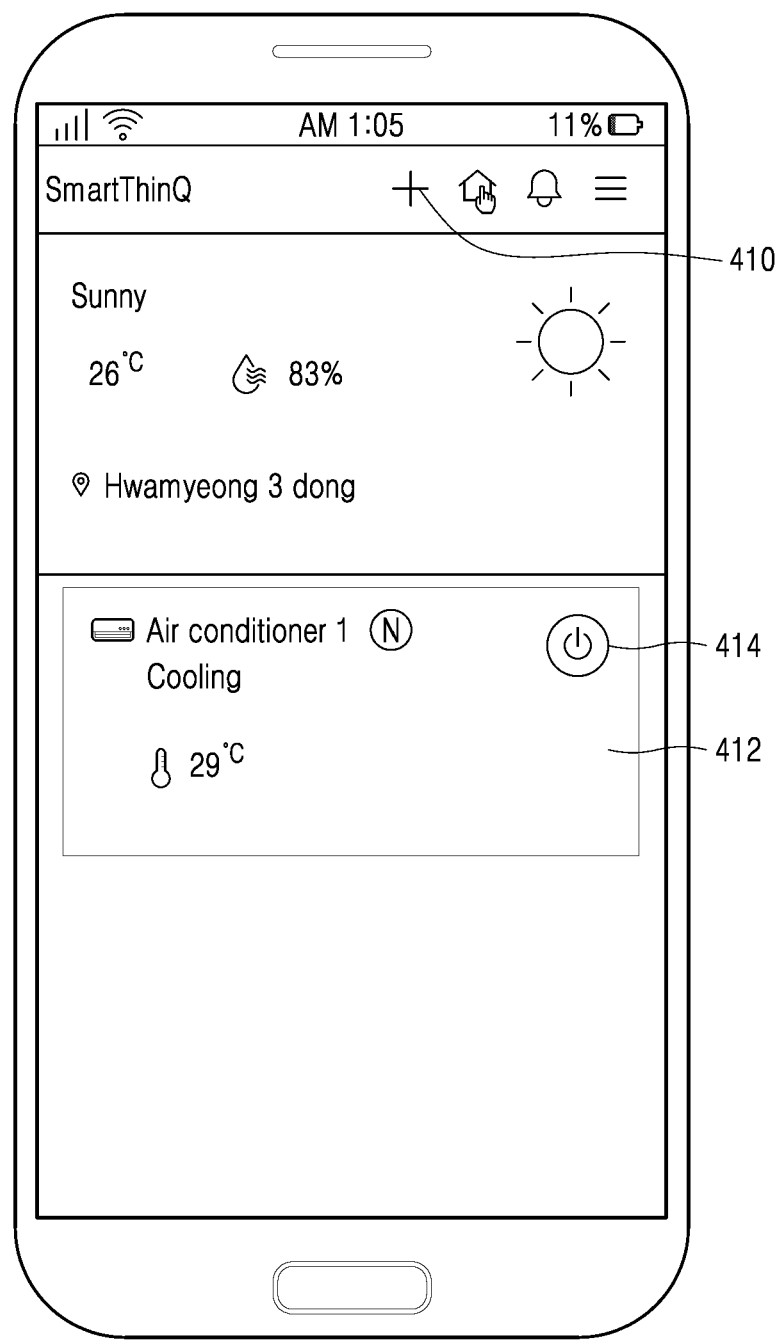
Figure 17:
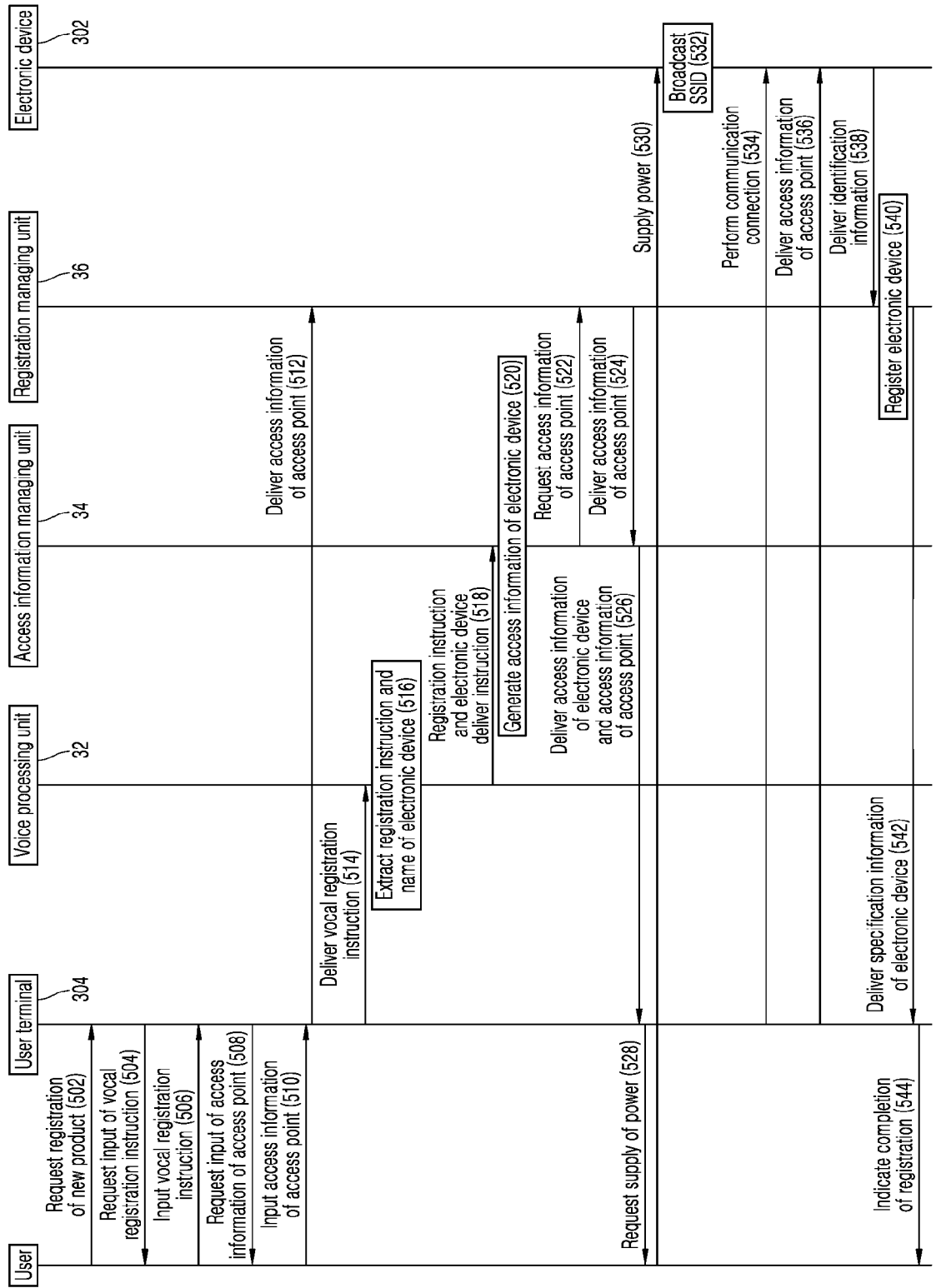
FIG. 17 is a flow chart showing a method for managing an electronic device in one embodiment.

FIG. 16 shows an initial screen displayed on the user terminal 304 after completion of the registration of the electronic device 302. An inquiry tab 412 for inquiring into information on the registered electronic device 302 or controlling the registered electronic device 302 may be displayed on the initial screen. The inquiry tab 412 may respectively display a power button 414 used to power on or off the electronic device 302, and information (e.g., during a cooling process, 29° C.) on an operation of the electronic device 302. The user may press (or touch) the registration button 410 on the initial screen to register another electronic device.

Figure 3:
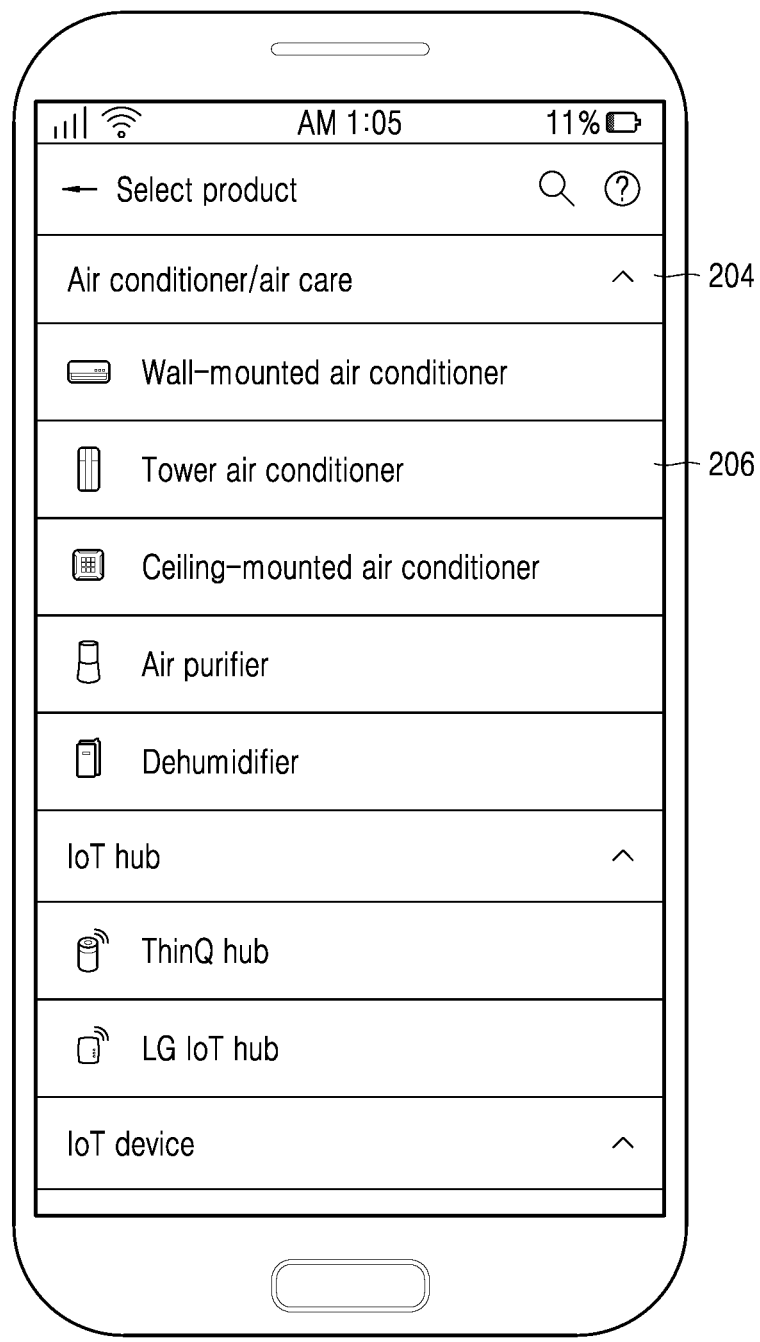
Figure 4:
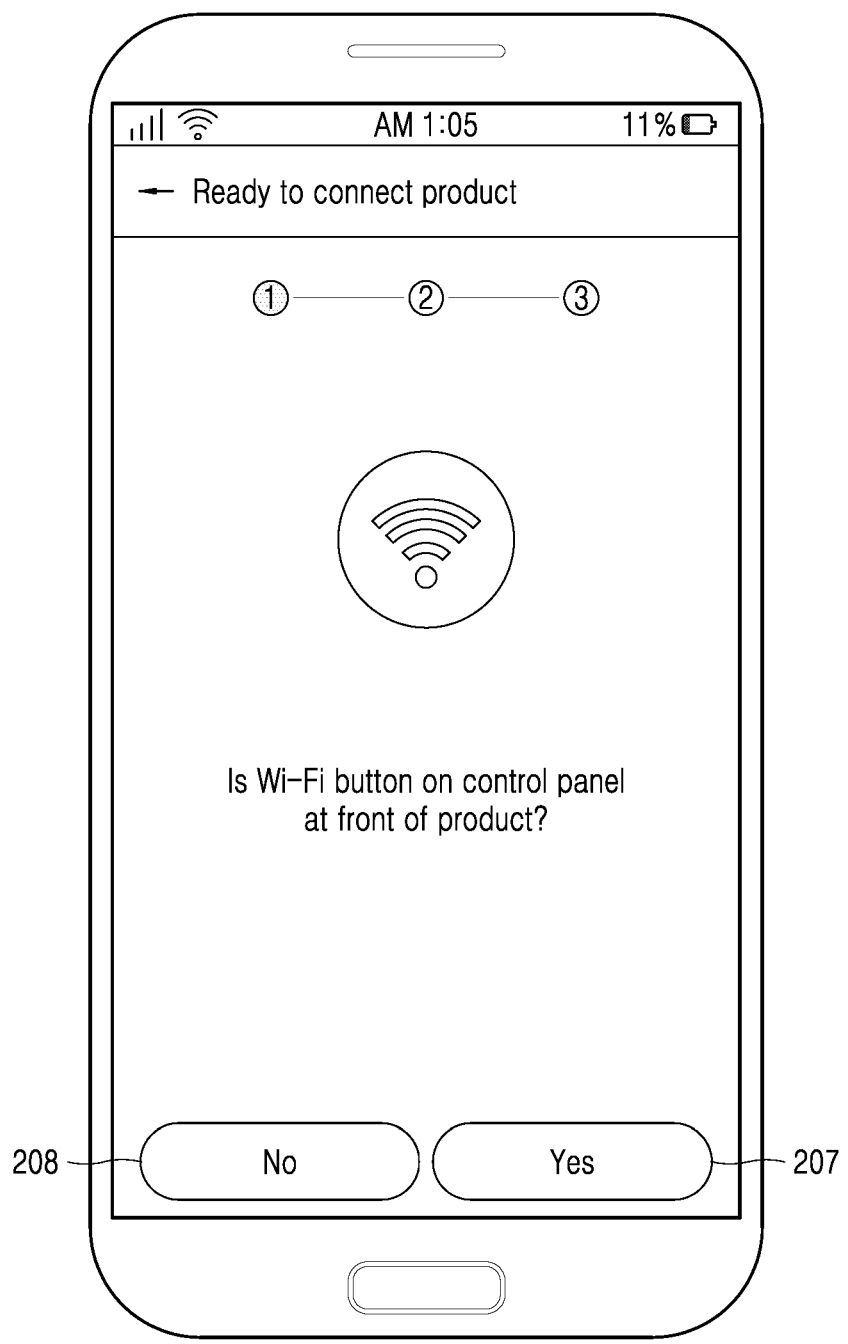
Figure 6:
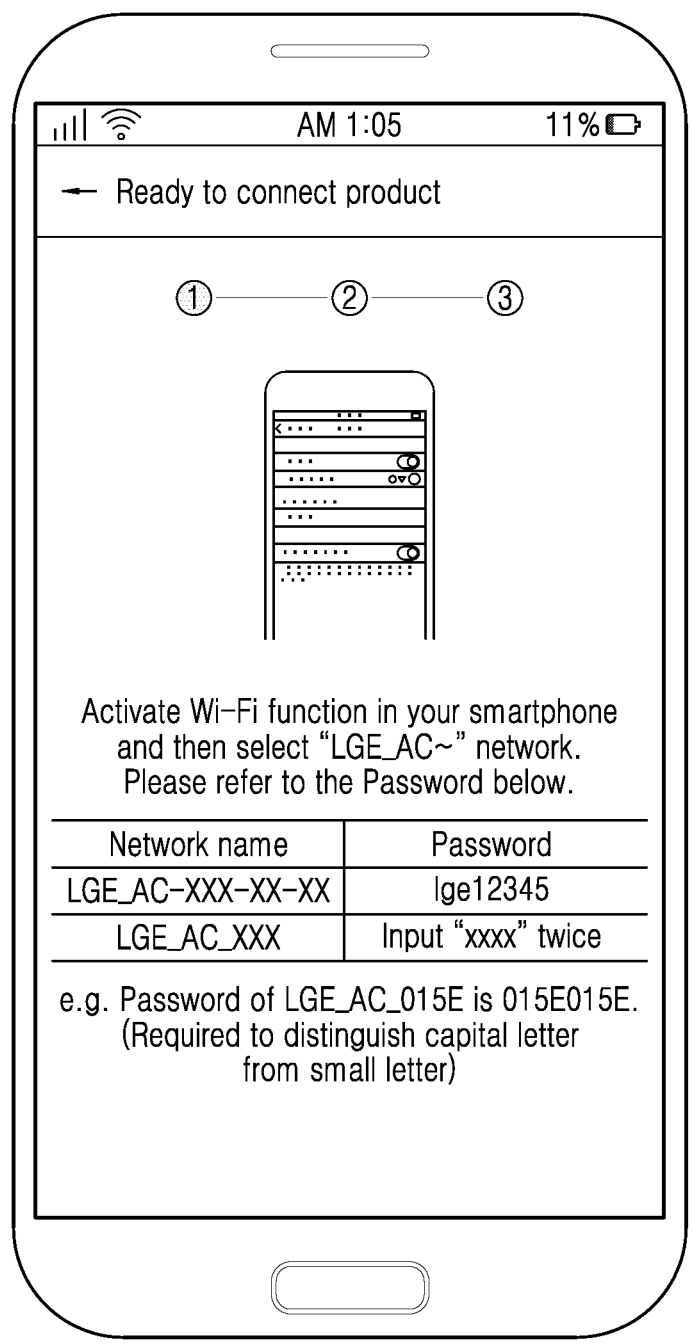
Figure 7:
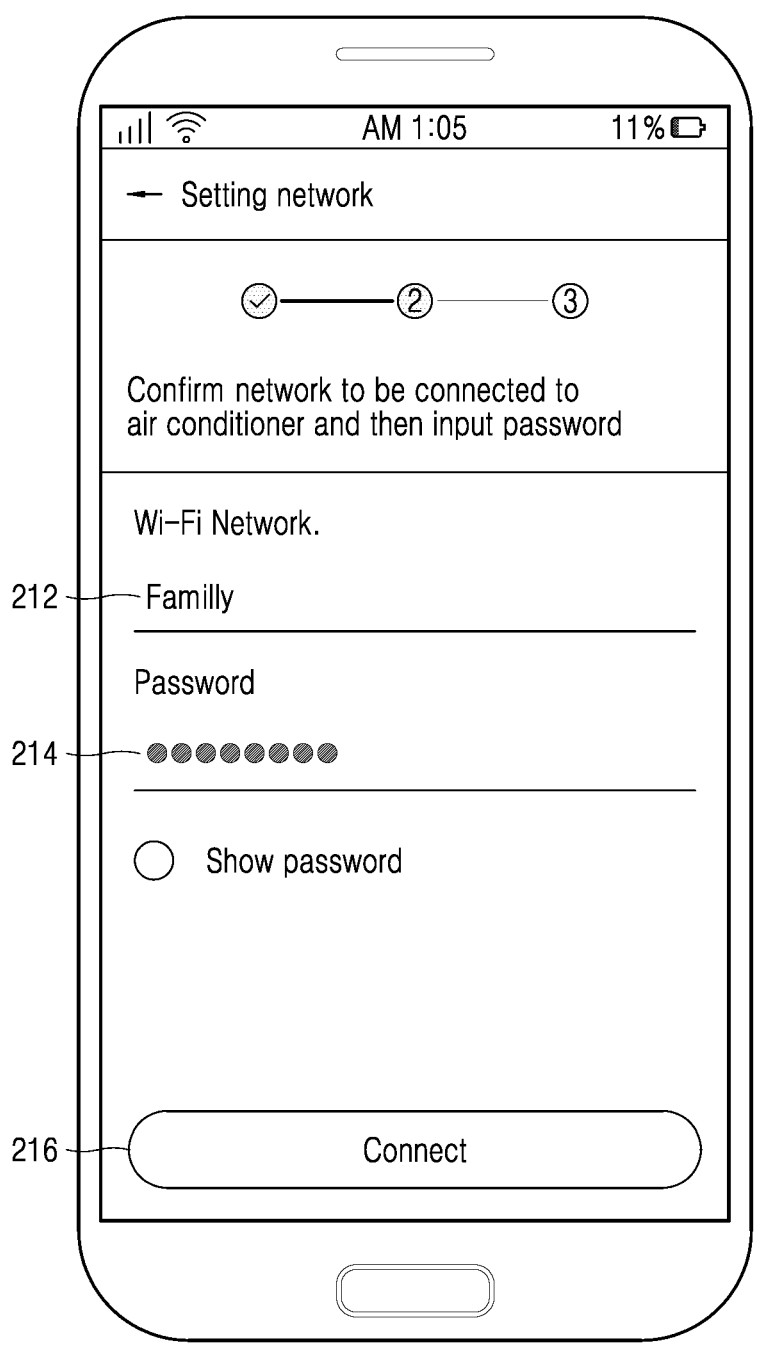
Figure 8:
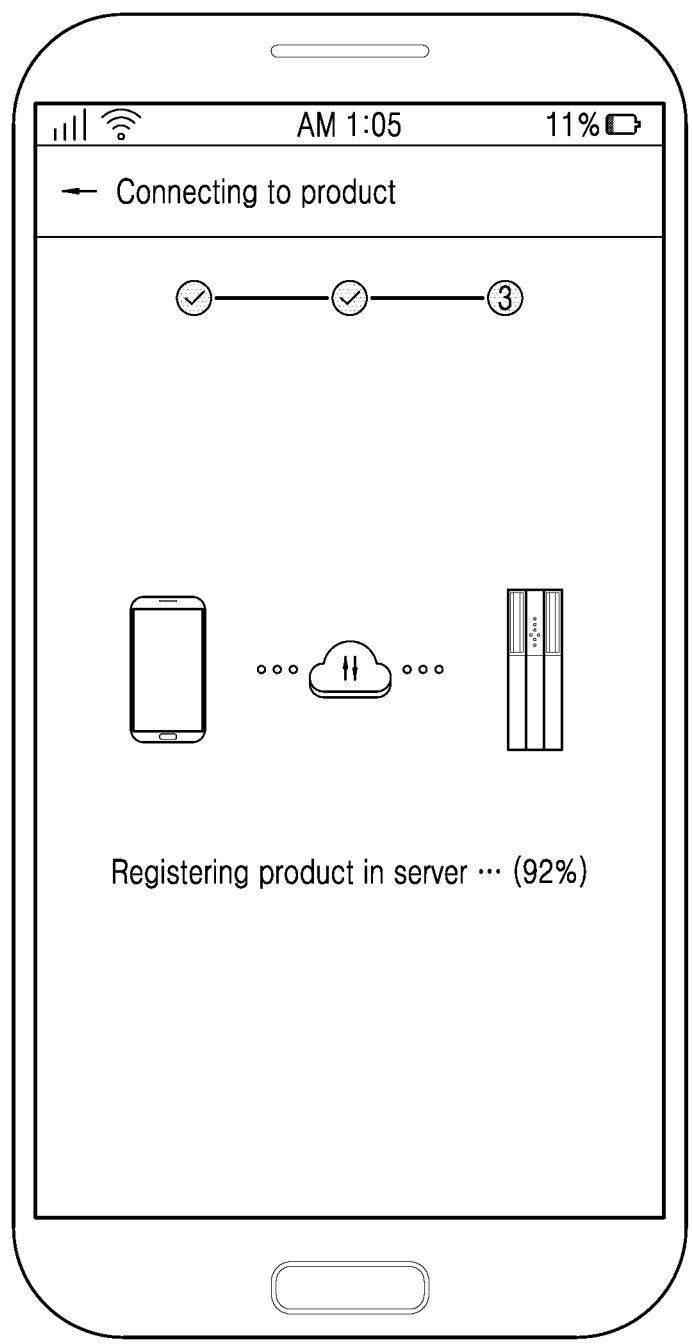
Figure 9:
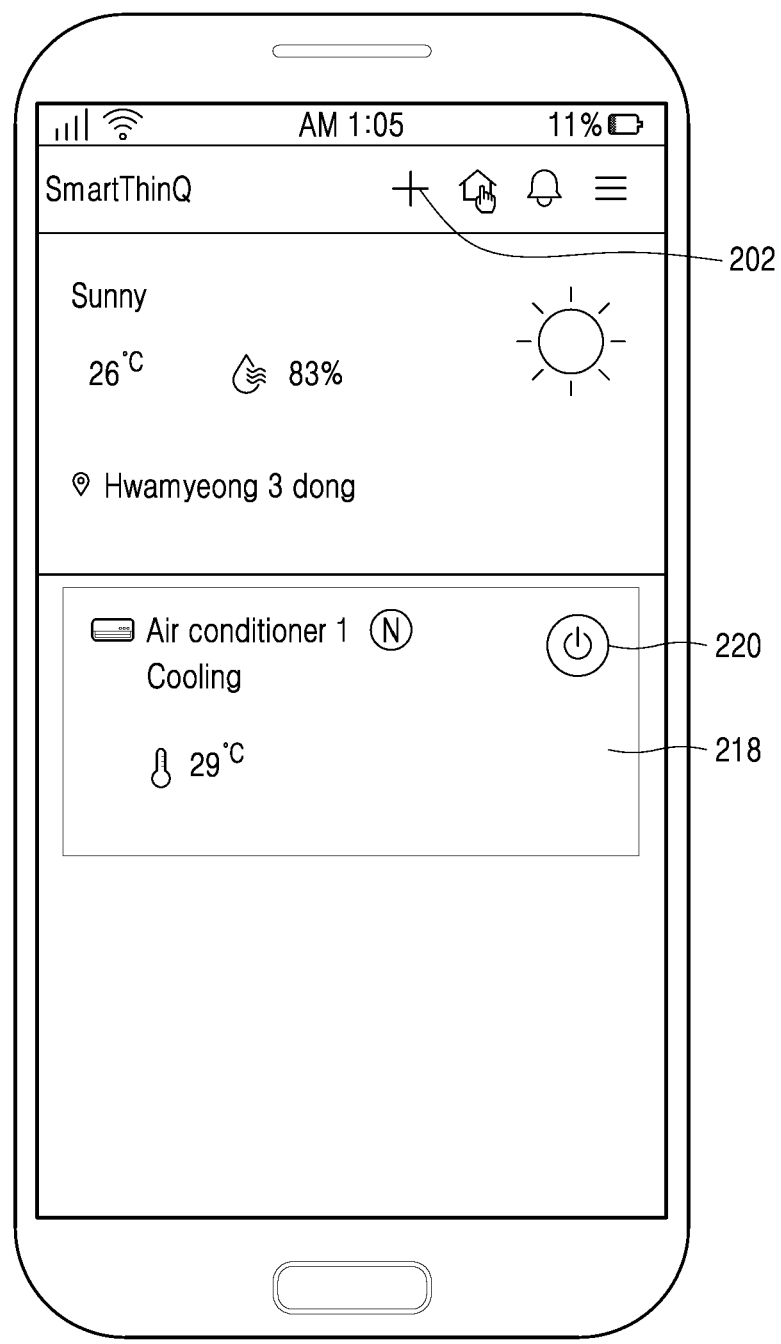

In at least one embodiment described above, the user desiring to register an electronic device 302 may simply press the registration button 402 (FIG. 11), utter (or speak) a vocal registration instruction (FIG. 12) and then power on the electronic device 302 to complete registration of the electronic device 302. That is, during registration of the electronic device 302, the user may utter (or speak) a vocal registration instruction and power on the electronic device 302, with no need to select a product group or a product family of the electronic device 302 (FIG. 3), examine features of the electronic device 302 and input information on the features of the electronic device 302 (FIGS. 4 and 5), and input access information of the electronic device 302 (FIG. 6) that are manipulations required in the disadvantageous arrangements. Accordingly, the user may perform manipulations for registering an electronic device more readily, perform manipulations for registering an electronic device 302 less frequently, and spend less time registering an electronic device 302.

In an embodiment of the present disclosure, the user does not have to directly confirm or input access information of the electronic device 302, and the user terminal 304 may automatically perform communication connection with the electronic device 302 using the access information of the electronic device 302, received from the registration managing unit 36, thereby enabling the electronic device 302 to be registered more readily and reduce the possibly of failing in the registration of the electronic device 302.

Additionally, a manufacturer and seller of an electronic device may give (or provide) the same access information to all electronic devices included in the same product family instead of giving different access information to an electronic device based on a product family or a product model of the electronic device. Thus, the existing access information may be given (or provided) to a new product in the same product family rather than new access information.

In one embodiment, a user may input a registration instruction to a user terminal using the user's voice without directly inputting or confirming various types of information when registering an electronic device in the user's account as an electronic device to be managed. For example, the user may utter (or speak) an instruction for requesting registration along with a product family of the electronic device to be registered. Thus, a procedure of confirming features of the electronic device may be omitted.

Additionally, a communication connection between an electronic device and a user terminal may be automatically performed without causing a user to conform or input access information of the electronic device. In one embodiment, the access information of the electronic device may be generated by an electronic device managing apparatus and delivered to the user terminal. Thus, the user terminal itself may perform communication connection with the electronic device using the access information of the electronic device, received from the electronic device managing apparatus, without causing the user to directly input the access information of the electronic device.

A method for managing an electronic device according to at least one example embodiment may include receiving a vocal registration instruction for registering an electronic device from a user terminal, generating access information of the electronic device based on the vocal registration instruction, transmitting the access information of the electronic device to the user terminal, receiving identification information of the electronic device from the electronic device as a result of completion of the user terminal's communication connection with the electronic device based on the access information of the electronic device, registering the electronic device in a user account based on the identification information of the electronic device, and transmitting specification information of the electronic device to the user terminal.

The generating of the access information of the electronic device based on the vocal registration instruction may include extracting a registration instruction and an electronic device name from the vocal registration instruction, and generating access information of the electronic device with reference to the electronic device name.

The method for managing an electronic device may further include transmitting access information of an access point to the user terminal. As a result of completion of the user terminal's communication connection with the electronic device based on the access information of the electronic device, the user terminal may transmit the access information of the access point to the electronic device, and the electronic device may perform communication connection with the access point based on the access information of the access point.

The access information of the electronic device may include a Service Set Identifier of the electronic device, and the Service Set Identifier may be set differently for each product family of the electronic device.

When the access information of the electronic device is transmitted to the user terminal, the electronic device may broadcast the access information of the electronic device, and the user terminal may perform communication connection with the electronic device based on the access information of the electronic device.

Registering the electronic device in a user account based on the identification information of the electronic device may include obtaining specification information of the electronic device based on the identification information of the electronic device.

The method for managing an electronic device may include transmitting driving state information of the electronic device to the user terminal or transmitting a driving instruction input from the user terminal to the electronic device based on the specification information of the electronic device.

As a result of receipt of specification information of the electronic device, the user terminal may output a text message or a voice message for indicating completion of the registration of the electronic device.

An apparatus for managing an electronic device according to one example embodiment may include a voice processing unit configured to receive a vocal registration instruction for registering an electronic device from a user terminal, an access information managing unit configured to generate access information of the electronic device based on the vocal registration instruction and transmit the access information of the electronic device to the user terminal, and a registration managing unit configured to receive identification information of the electronic device from the electronic device as a result of completion of the user terminal's communication connection with the electronic device based on the access information of the electronic device, register the electronic device in a user account based on the identification information of the electronic device, and transmit specification information of the electronic device to the user terminal.

The voice processing unit may extract a registration instruction and an electronic device name from the vocal registration instruction, and the access information managing unit may generate access information of the electronic device with reference to the electronic device name.

The access information managing unit may transmit access information of an access point to the user terminal. In one embodiment, as a result of completion of the user terminal's communication connection with the electronic device based on the access information of the electronic device, the user terminal may transmit the access information of the access point to the electronic device, and the electronic device may perform communication connection with the access point based on the access information of the access point.

The access information of the electronic device may include a Service Set Identifier of the electronic device, and the Service Set Identifier may be set differently for each product family of the electronic device.

When the access information of the electronic device is transmitted to the user terminal, the electronic device may broadcast the access information of the electronic device, and the user terminal may perform communication connection with the electronic device based on the access information of the electronic device.

The registration managing unit may obtain specification information of the electronic device based on the identification information of the electronic device.

The registration managing unit may transmit driving state information of the electronic device to the user terminal and/or transmit a driving instruction input from the user terminal to the electronic device based on the specification information of the electronic device.

As a result of receipt of specification information of the electronic device, the user terminal may output a text message or a voice message for indicating completion of the registration of the electronic device.

According to example embodiments, a user may register an electronic device in the user's account as an electronic device to be managed as a result of manipulation that is performed more simply and less frequently.

According to example embodiments, communication connection between an electronic device and a user terminal may be performed without causing a user to directly input access information of the electronic device during registration of the electronic device in the user's account as an electronic device to be managed.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing an electronic device, comprising:
  receiving, from a user terminal, a vocal registration instruction for registering the electronic device;
  obtaining a Service Set Identifier(SSID) of the electronic device for a communication connection with the user terminal and a password corresponding to the SSID, wherein the SSID and the password are input by a user through the user terminal;
  generating access information of the electronic device, wherein the generated access information is the same as access information previously stored in the electronic device;
  transmitting, to the user terminal, the generated access information of the electronic device;
  determining whether a communication connection between the user terminal and the electronic device based on the transmitted access information is automatically performed;
  receiving, from the electronic device, identification information of the electronic device;
  registering the electronic device in a user account based on the received identification information of the electronic device; and
  transmitting, to the user terminal, specification information of the electronic device.

2. The method of claim 1, wherein the obtaining comprises:
  extracting, from the vocal registration instruction, a registration instruction and a name of the electronic device; and
  generating the access information of the electronic device based on the extracted name of the electronic device.

3. The method of claim 1, further comprising:
  transmitting, to the user terminal, access information of an access point;
  as the result of the communication connection between the user terminal and the electronic device, transmitting, by the user terminal and to the electronic device, the access information of the access point; and
  performing communication connection between the electronic device and the access point based on the access information of the access point.

4. The method of claim 1, wherein the SSID is different for each product family of the electronic device.

5. The method of claim 1, wherein after the transmitting of the access information of the electronic device to the user terminal, broadcasting, by the electronic device, the access information of the electronic device, and
  performing, by the user terminal, communication connection with the electronic device based on the access information of the electronic device.

6. The method of claim 1, wherein the registering of the electronic device includes obtaining the specification information of the electronic device based on the received identification information of the electronic device.

7. The method of claim 6, comprising transmitting, to the user terminal, driving state information of the electronic device, or transmitting, to the electronic device, a driving instruction input from the user terminal based on the specification information.

8. The method of claim 1, wherein in response to receiving the specification information of the electronic device at the user terminal, outputting a text message or a voice message for indicating completion of the registration of the electronic device.

9. An apparatus for managing an electronic device, comprising:
  a voice processor configured to receive, from a user terminal, a vocal registration instruction for registering the electronic device;
  an access information managing device configured to:
    obtain a Service Set Identifier (SSID) of the electronic device for a communication connection with the user terminal and a password corresponding to the SSID, wherein the SSID and the password are input by a user through the user terminal,
    generate access information of the electronic device, wherein the generated access information is the same as access information previously stored in the electronic device, and
    transmit the generated access information of the electronic device to the user terminal; and
  a registration managing device configured to:
    determine whether a communication connection between the user terminal and the electronic device based on the transmitted access information is automatically performed,
    receive, from the electronic device, identification information of the electronic device,
    register the electronic device in a user account based on the received identification information of the electronic device, and
    transmit specification information of the electronic device to the user terminal.

10. The apparatus of claim 9, wherein the voice processor is configured to extract, from the vocal registration instruction, a registration instruction and a name of the electronic device, and
  the access information managing device is configured to generate the access information of the electronic device based on the extracted name of the electronic device.

11. The apparatus of claim 9, wherein the access information managing device is configured to transmit access information of an access point to the user terminal,
  as the result of the communication connection between the user terminal and the electronic device, the user terminal is to transmit the access information of the access point to the electronic device, and
  the electronic device is configured to perform communication connection between the electronic device and the access point based on the access information of the access point.

12. The apparatus of claim 9, wherein the SSID is different for each product family of the electronic device.

13. The apparatus of claim 9, wherein after the access information managing device is to transmit the access information of the electronic device to the user terminal, the electronic device is to broadcast the access information of the electronic device, and
  the user terminal is configured to perform communication connection with the electronic device based on the access information of the electronic device.

14. The apparatus of claim 9, wherein the registration managing device is configured to obtain the specification information of the electronic device based on the received identification information of the electronic device.

15. The apparatus of claim 14, wherein the registration managing device is configured to transmit, to the user terminal, driving state information of the electronic device, or to transmit a driving instruction input from the user terminal based on the specification information.

16. The apparatus of claim 9, wherein in response to the user terminal receiving the specification information of the electronic device, the user terminal is configured to output a text message or a voice message for indicating completion of the registration of the electronic device.

17. A method for communicating information regarding an electronic device, comprising:
 receiving, from a terminal, a vocal comment for registering the electronic device;
 obtaining a Service Set Identifier (SSID) of the electronic device for a communication connection with the user terminal and a password corresponding to the SSID, wherein the SSID and the password are input by a user through the user terminal;
 generating access information of the electronic device, wherein the generated access information is the same as access information previously stored in the electronic device;
 transmitting, to the terminal, the generated access information of the electronic device;
 determining whether a communication connection between the terminal and the electronic device based on the transmitted access information is automatically performed;
 receiving, from the electronic device, identification information of the electronic device based on the access information of the electronic device;
 registering the electronic device in an account based on the received identification information of the electronic device; and
 providing, to the terminal, additional information regarding the electronic device.

18. The method of claim 17, wherein the obtaining includes:
 obtaining, from the vocal comment, a registration instruction and a name of the electronic device; and
 providing the access information of the electronic device based on the obtained name of the electronic device.

19. The method of claim 17, comprising:
 transmitting, to the terminal, access information of an access point,
 transmitting the access information of the access point from the terminal to the electronic device, and
 communicating the electronic device with the access point based on the access information of the access point.

20. The method of claim 17, wherein the SSID is different for each product family of the electronic device.

* * * * *